(12) United States Patent
Hahn et al.

(10) Patent No.: US 12,379,027 B2
(45) Date of Patent: Aug. 5, 2025

(54) GEARBOX ACTUATOR UNIT AND GEARBOX

(71) Applicants: ZF Friedrichshafen AG, Friedrichshafen (DE); ZF CV Systems Global GmbH, Bern (CH)

(72) Inventors: Stephan Hahn, Bundorf (DE); Holger Kelpe, Seelze (DE); Michael Günther, Wennigsen (DE); Hansjörg Kraft, Hannover (DE)

(73) Assignees: ZF Friedrichshafen AG, Friedrichshafen (DE); ZF CV Systems Global GmbH, Bern (CH)

( * ) Notice: Subject to any disclaimer, the term of this patent is extended or adjusted under 35 U.S.C. 154(b) by 107 days.

(21) Appl. No.: 18/233,430

(22) Filed: Aug. 14, 2023

(65) Prior Publication Data

US 2024/0060564 A1    Feb. 22, 2024

(30) Foreign Application Priority Data

Aug. 16, 2022    (DE) ..................... 10 2022 208 483.7

(51) Int. Cl.
*F16H 63/30* (2006.01)
*F16H 57/02* (2012.01)
(Continued)

(52) U.S. Cl.
CPC ......... *F16H 63/304* (2013.01); *F16H 57/029* (2013.01); *F16H 57/0415* (2013.01);
(Continued)

(58) Field of Classification Search
CPC .......... F16H 63/304; F16H 2063/3059; F16H 63/28; F16H 63/32
See application file for complete search history.

(56) References Cited

U.S. PATENT DOCUMENTS

| | | | |
|---|---|---|---|
| 6,336,372 B1 * | 1/2002 | Ogami | F16H 61/32 74/335 |
| 10,704,681 B2 * | 7/2020 | Lee | F16H 61/32 |

(Continued)

FOREIGN PATENT DOCUMENTS

| | | |
|---|---|---|
| AT | 007865 U1 | 10/2005 |
| CN | 111006012 A * | 4/2020 |

(Continued)

OTHER PUBLICATIONS

CN111006012-A Machine Translation (Year: 2020).*

*Primary Examiner* — Jake Cook
(74) *Attorney, Agent, or Firm* — Dickinson Wright PLLC

(57) ABSTRACT

A gearbox actuator unit (14) is configured to be arranged on a gearbox (10) and includes a housing (22), a control device (24), and an actuator (28, 30). The housing (22) is configured to attach to a gearbox housing (12) and to seal the gearbox housing (12). The control device (24) is electrically connected to the actuator (28, 30) and activates the actuator (28, 30). A pinon of the actuator (28, 30) is configured to actuate a rack of a shift fork (18, 20) of the gearbox (10) and can be connected to the shift fork (18, 20) of the gearbox (10). The control device (24) and the actuator (28, 30) are arranged within the housing (22), with the pinion extending through an opening of the housing. A gearbox (10) with a housing (12) having an opening (44) receives the actuator unit (14), which closes and seals the opening (44).

18 Claims, 5 Drawing Sheets

(51) Int. Cl.
*F16H 57/029* (2012.01)
*F16H 57/04* (2010.01)
*F16H 63/28* (2006.01)
*F16H 63/32* (2006.01)

(52) U.S. Cl.
CPC ............ *F16H 63/28* (2013.01); *F16H 63/32* (2013.01); *F16H 2057/02026* (2013.01); *F16H 2057/02043* (2013.01); *F16H 2063/3059* (2013.01)

(56) References Cited

U.S. PATENT DOCUMENTS 11,767,903 B2 * 9/2023 Wei .................. F16H 25/20 74/89.23
2022/0128145 A1 * 4/2022 Geis-Esser .............. F16H 61/32

FOREIGN PATENT DOCUMENTS

DE 102019107644 A1 10/2019
DE 102019200498 A1 7/2020

* cited by examiner

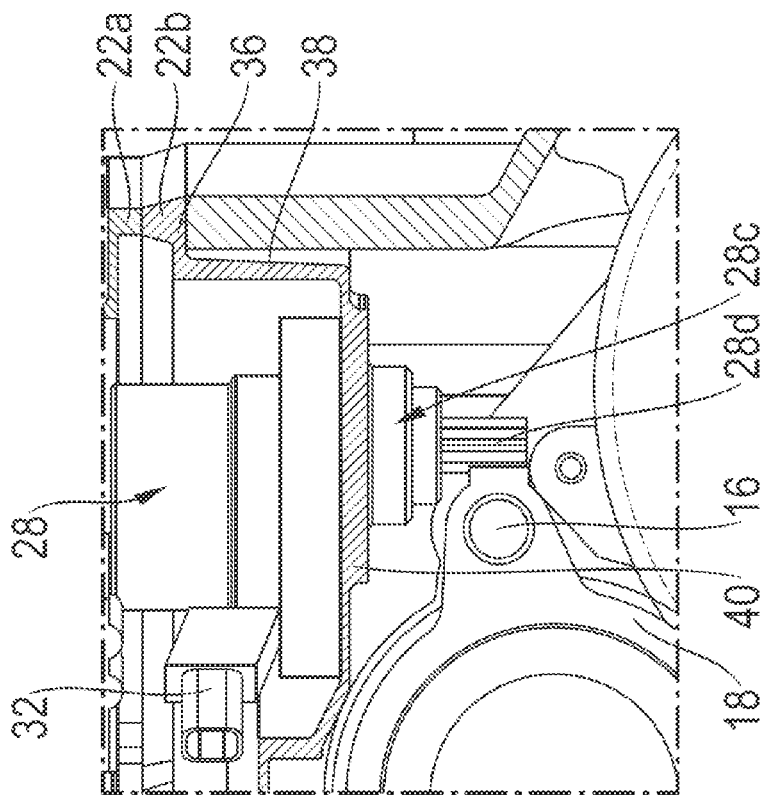
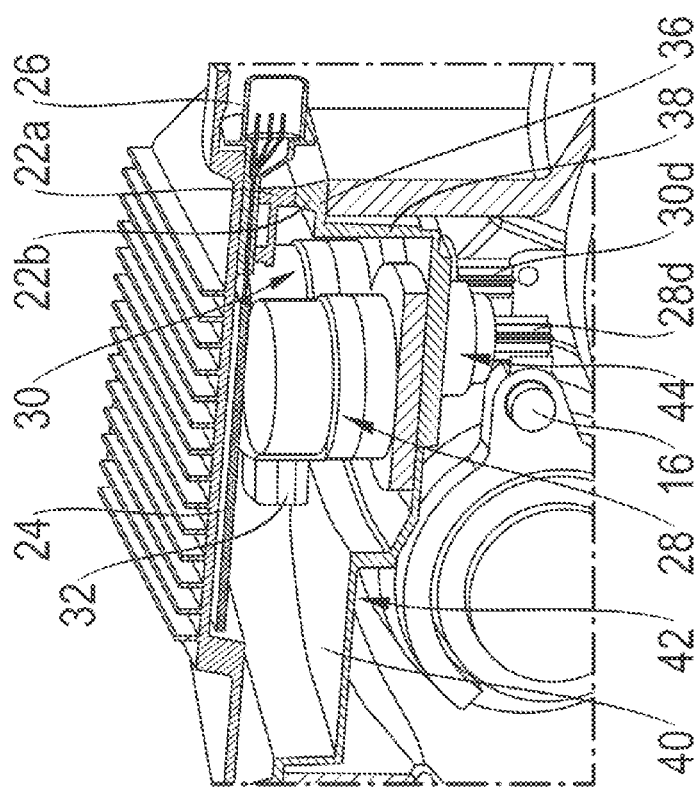
Fig. 4
Fig. 3

GEARBOX ACTUATOR UNIT AND GEARBOX

FIELD

The invention relates to a gearbox actuator unit and to a gearbox including a gearbox actuator unit of this type.

BACKGROUND

In the prior art, gearboxes which are shifted by electric actuators are known. An electric actuator of this type, which includes an electric motor, provides a rotational movement, which in turn is converted into a linear movement of a shift fork. The linear movement of the shift fork shifts a gear of the gearbox.

SUMMARY

The object of the invention is to provide a gearbox and a gearbox actuator unit which has a compact construction, a long service life, and makes it possible to achieve simple, rapid installation.

This object is achieved by a gearbox actuator unit according to one or more aspects described herein.

A gearbox actuator unit of this type, which is formed so as to be arranged on a gearbox, includes a housing, a control device, and an actuator, wherein the housing is formed so as to be attached to a gearbox housing and to seal the gearbox housing, wherein the control device is electrically connected to the actuator and is formed so as to activate the actuator, wherein the actuator is formed so as to actuate a shift fork of the gearbox and can be connected to a shift fork of the gearbox, wherein the control device and the actuator are arranged within the housing.

In particular, a gearbox of this type and a gearbox actuator unit of this type are provided for use in a commercial motor vehicle, in particular a truck.

The control device can be connected to a motor vehicle, in particular to a main control device or a sub-control device of the motor vehicle. The control device receives commands for controlling the gearbox and implements such commands. Additionally, the control device is electrically connected to the actuator and controls the actuator. The actuator provides a mechanical movement suitable for shifting gears in the gearbox. In particular, the actuator comprises an electric motor and a pinion. The electric motor is advantageously formed as a BLDC motor, brushless DC motor, or brushless direct-current motor. The housing provides a protected receiving chamber for components of the gearbox actuator unit. In particular, the housing protects these components from contaminants in the environment as well as from contaminants and oil in the interior of the gearbox. The housing is advantageously formed so as to be fluid-tight so that contaminants or fluid are unable to penetrate into the interior.

Furthermore, the housing is used for attachment to the gearbox, wherein as a result, the components of the gearbox actuator unit are also attached to the gearbox accordingly. In an assembled state of the gearbox, the gearbox actuator unit is attached to the gearbox housing. Formed on a gearbox of this type is an access opening which provides a receiving chamber for the gearbox actuator unit and, furthermore, allows engagement in the gearbox. This reduces the material required for the gearbox housing and also makes additional installation space available for arranging components in the region of the gearbox housing wall. The gearbox actuator unit is formed so as to close the access opening of the gearbox housing in a fluid-tight manner. When installed, the housing seals the access opening in a fluid-tight manner.

The actuator can be connected to a shift fork of the gearbox. For example, a shift fork forms a rack which can be brought into engagement with a pinion of the actuator. After the gearbox actuator unit has been installed on the gearbox, the pinion and rack are mutually meshed. A rotational movement of the pinion provides an axial linear movement of the shift fork. A mechanical connection between the actuator and the shift fork is formed, for example, by direct or indirect contact. In the case of indirect contact, a transfer element is formed for example which transfers a mechanical activation movement of the actuator to the shift fork. An actuator, in particular the pinion, engages in a rack, for example in a parallel manner or at a slight incline. A slight incline substantially facilitates the process of intermeshing the actuators with the racks.

Arranging the control device and the actuator within the housing ensures a compact arrangement in a contaminant-free environment. In addition, a gearbox actuator unit of this type can be installed in a simple manner during final assembly of the gearbox. The pre-assembled gearbox actuator unit is inserted into the gearbox and attached, for example screwed. Installation is thus rapid and simple. Favorably, only the control device and the actuator are arranged within the housing.

The configurations set out below represent advantageous embodiment variants of the gearbox actuator unit.

Advantageously, the housing is formed in a plurality of portions and has at least a first housing portion and a second housing portion.

This ensures that the components can be installed in a simple manner within the gearbox actuator unit. The housing portions are advantageously rigidly connected to each other. The housing portions are also advantageously connected to each other in a fluid-tight manner. The gearbox actuator unit and the gearbox housing are favorably connected to each other in a fluid-tight manner. Favorably, one of the housing portions is connected to the gearbox housing in a fluid-tight manner. Advantageously, a control device is attached to one of the housing portions, wherein the actuator is attached to another housing portion.

It is proposed that a housing portion has cooling fins.

The cooling fins make it possible to dissipate the heat generated in the interior of the gearbox actuator unit, for example heat from the control device. The control device is formed, for example, by a circuit board populated with electronic components. The control device is preferably in direct and heat-conducting contact with the housing portion with the cooling fins. Favorably, the control device is attached to the housing portion with the cooling fins. The housing portion with the cooling fins favorably faces an environment or is arranged outside an interior of the gearbox.

More advantageously, a housing portion is formed so as to be pot-shaped.

The pot-shaped housing portion is favorably the counterpart to the housing portion with cooling fins. The pot shape provides a receiving chamber for the components of the gearbox actuator unit. This receiving chamber is also referred to as the interior of the gearbox actuator unit. The interior or pot shape makes it possible, inter alia, to arrange the actuator within the housing. The actuator is advantageously attached to the pot-shaped housing portion. The pot-shaped housing portion has, for example, a rim, a wall, and a base. The rim makes it possible to achieve an advantageous configuration for providing a contact face by way of the housing portion and the housing of the gearbox actuator unit. This contact face is formed so as to correspond to a contact face of the gearbox housing. The contact faces make it possible to achieve a fluid-tight connection between the gearbox housing and the housing. When installed, the housing is attached on the access opening of the gearbox housing and a fluid-tight seal is ensured. Advantageously, a contact face of the housing or the housing portion is formed by a planar and peripherally closed surface. The base is offset axially relative to the rim. Advantageously, the surfaces of the base and the rim are formed so as to be substantially parallel to each other. The wall, which preferably extends substantially perpendicularly to the rim and the base, provides an axial offset between the rim and the base. The wall is likewise peripherally closed. In particular, the rim and the wall surround the base fully in a peripheral manner. In an embodiment variant, the base is axially offset so that a plurality of planes is formed. This axial offset formed in the base makes it possible to achieve greater engagement in certain regions in the interior of the gearbox, so as to form sufficient installation space for the actuator in the interior of the housing. In addition, an axial offset of this type in the base in another region of the housing portion results in less engagement in the interior of the gearbox, so that installation space is optimized for the components of the gearbox.

It is further proposed that the actuator has a pinion which passes through an opening in the housing and extends beyond the housing.

The pinion extends from the housing and engages in the interior of the gearbox. An opening of this type is preferably formed in one of the housing portions. Preferably, the opening is arranged in the housing portion which is assigned to the interior of the gearbox, in particular the pot-shaped housing portion. Because the pinion engages in the interior, it is formed so as to interact mechanically in a direct or indirect manner with the shift fork.

Particularly advantageously, the actuator has a transmission.

The transmission makes it possible to achieve a long service life of the electric motor and also precise, rapid activation of the shift fork. The transmission is advantageously formed by a gear transmission, for example two gear wheels. The transmission is preferably arranged between the pinion and a rotor of the electric motor. The transmission ratio is advantageously greater than 1, so that a full rotation of the rotor is translated into a partial rotation of the pinion.

It is proposed that the opening in the housing is sealed in a fluid-tight manner.

This protects the components of the gearbox actuator unit from contaminants in the environment as well as from oil in the interior of the gearbox.

Favorably, the opening in the housing is sealed by a radial shaft seal.

The radial shaft seal makes it possible for the actuator, in particular the pinion, to pass through the opening in the housing in a fluid-tight manner.

Particularly advantageously, the gearbox actuator unit has one, two, three, or more actuators.

Consequently, a high degree of pre-assembly for the gearbox is provided by the gearbox actuator unit. The gearbox can thus be assembled in a simple, rapid manner. In addition, all components of the gearbox actuator unit which are arranged in the interior are protected from contaminants.

Favorably, the housing has a planar and peripherally closed contact face for making contact with the gearbox housing.

This ensures that the access opening of the gearbox can be sealed in a simple manner. The planar contact face of the housing corresponds to a planar contact face of the gearbox housing. For example, the contact face of the housing is formed by a rim of the aforementioned pot-shaped housing portion. The contact between the contact faces is direct or indirect. In the case of direct contact, the contact faces contact each other directly. In the case of indirect contact, a sealing element, for example an elastomer seal, is arranged between the corresponding contact faces. The sealing element is formed so as to be peripherally circular. The sealing element is formed for example by a gasket. Alternatively, the sealing element is formed by a molded ring or sealing ring. A molded ring or sealing ring of this type is configured, for example, in a groove of the contact face. A groove of this type is preferably formed in the housing and/or the gearbox housing.

Further advantageously, the control device has a connection element for establishing an electrical connection with the vehicle.

This connection element is, for example, a portion of a plug and socket connection. In particular, the connection element is arranged on the exterior of the housing. Favorably, an access passage through the housing is formed so as to be dust-tight or fluid-tight. The connection element connects the control device to a further control device of the vehicle, for example the main control device or the sub-control device.

Favorably, the control device is connected to the actuator directly or via plug connections.

Plug connections make it possible to install the actuators and the control device simply within the housing, since the electrical connection is achieved in a simple manner via insertion. A direct connection between the actuators and the control device makes it possible to achieve a compact and simple construction. For example, the actuators are directly electrically connected to a circuit board of the control device and are arranged on or attached directly to this circuit board.

The gearbox actuator unit advantageously has at least two actuators, wherein an engagement length of one actuator is greater than an engagement length of another actuator.

Each of the actuators is formed so as to be connectable to a shift fork in order to actuate the latter. Regardless of whether a connection of this type is direct or indirect, engagement is provided between the actuator and the shift fork or a transfer element. Advantageously, engagement of this type takes the form of a rack-pinion connection, so that a rotational movement of the pinion is converted into a linear movement of the rack. The engagement length is determined by the length between the point of engagement and the final position of the actuator. During installation, the pinion is inserted for example into the rack, wherein an initial point of contact between the pinion and the rack corresponds to the point of engagement. On the pinion, the place of contact is defined as the point of contact. The actuator is then inserted until it has reached the final position thereof. The original point of contact thus also moves to the final position thereof. A distance between the point of engagement and the final position of the point of contact constitutes the engagement length. In the case of differing engagement lengths, one of the actuators engages further than the other actuator. The final position of the point of contact is, however, determined by the final position of the gearbox actuator unit, which is preferably inserted in a linear movement. As a result, during installation, the pinion of the actuator with the longer engagement length makes contact with the rack earlier than the pinion of the actuator with the shorter engagement length. Accordingly, the actuators and the pinions thereof come into contact with the racks in succession during the installation process, so that the installation process is substantially simplified for two or more actuators. Differing installation lengths are achieved, for example, by positioning the actuators on different planes with a height offset. Alternatively, differing installation lengths are preferably provided by actuators with pinions of different lengths. Advantageously, all actuators of the gearbox actuator unit have different engagement lengths.

Advantageously, an electric motor of an actuator is formed by a BLDC motor, which optionally has a transmission. This achieves a long operational life with rapid, precise activation.

The above object is further achieved by a gearbox and advantageous configurations of a gearbox as set forth herein, including a gearbox actuator unit as described herein.

Particularly advantageously, the gearbox has an access opening, wherein the gearbox actuator unit is arranged on the access opening, and closes and seals the latter. In particular, the gearbox actuator unit is attached to the gearbox.

The access opening provides additional installation space in the gearbox and this space enables the gearbox actuator unit and the components thereof to be arranged. In addition, the actuators engage in the interior of the gearbox through the access opening.

Particularly advantageously, the gearbox actuator unit is arranged at the top of the gearbox.

In this embodiment variant, the actuators engage downward into the gearbox from the top. "Top" corresponds to the upper side of a gearbox when fitted in a vehicle. Accordingly, an access opening is also formed at the top of the gearbox.

BRIEF DESCRIPTION OF THE DRAWINGS

The gearbox actuator unit and the gearbox are set out in detail below by way of example with reference to a plurality of figures. In the drawings:

FIG. 3 shows a further cross-sectional view of the gearbox and the gearbox actuator unit;

FIG. 4 shows a further cross-sectional view of the gearbox and the gearbox actuator unit;

DETAILED DESCRIPTION

Figure 1:
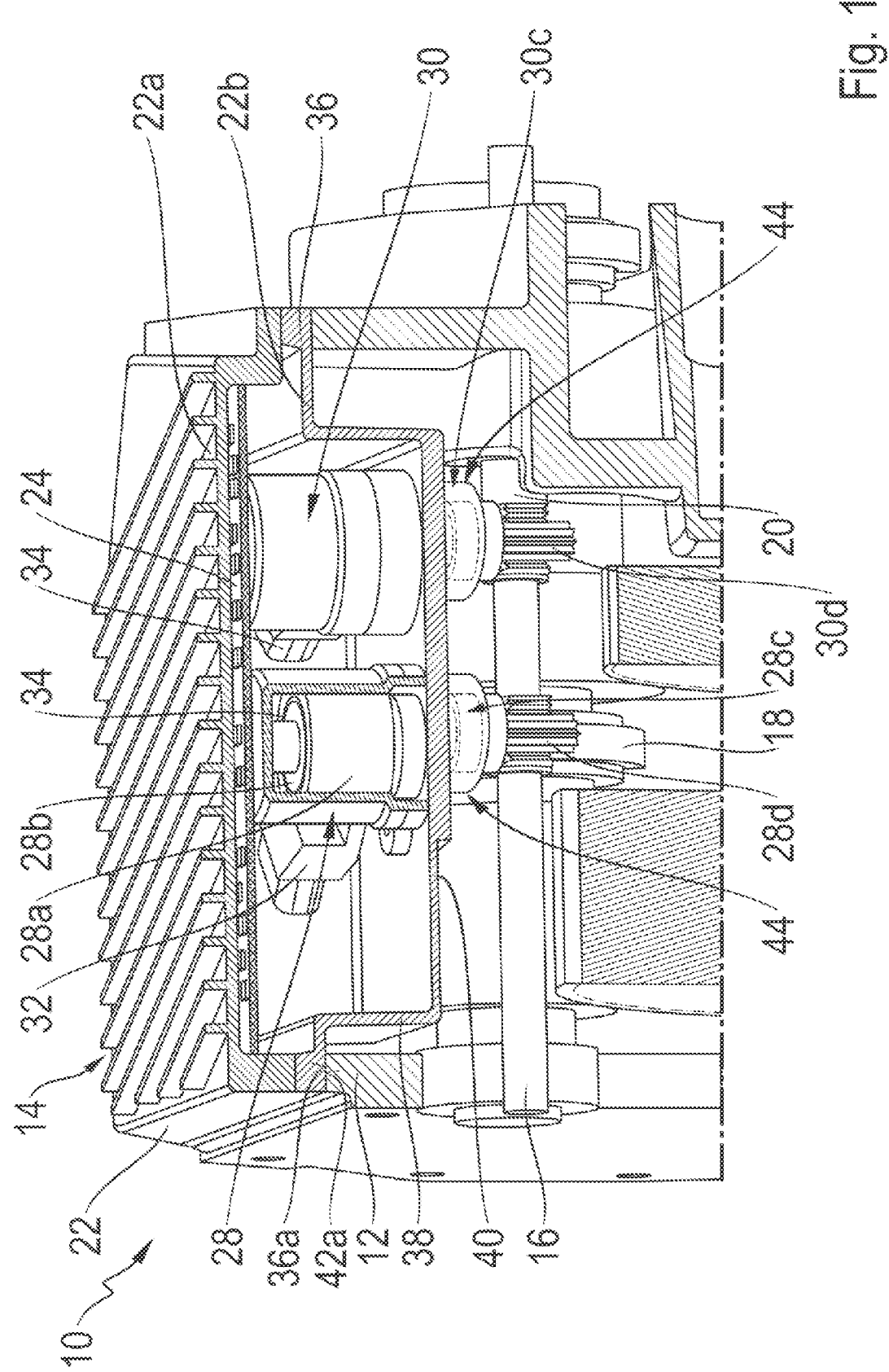
FIG. 1 shows a cross-sectional view of a gearbox including a gearbox actuator unit.
Figure 2:
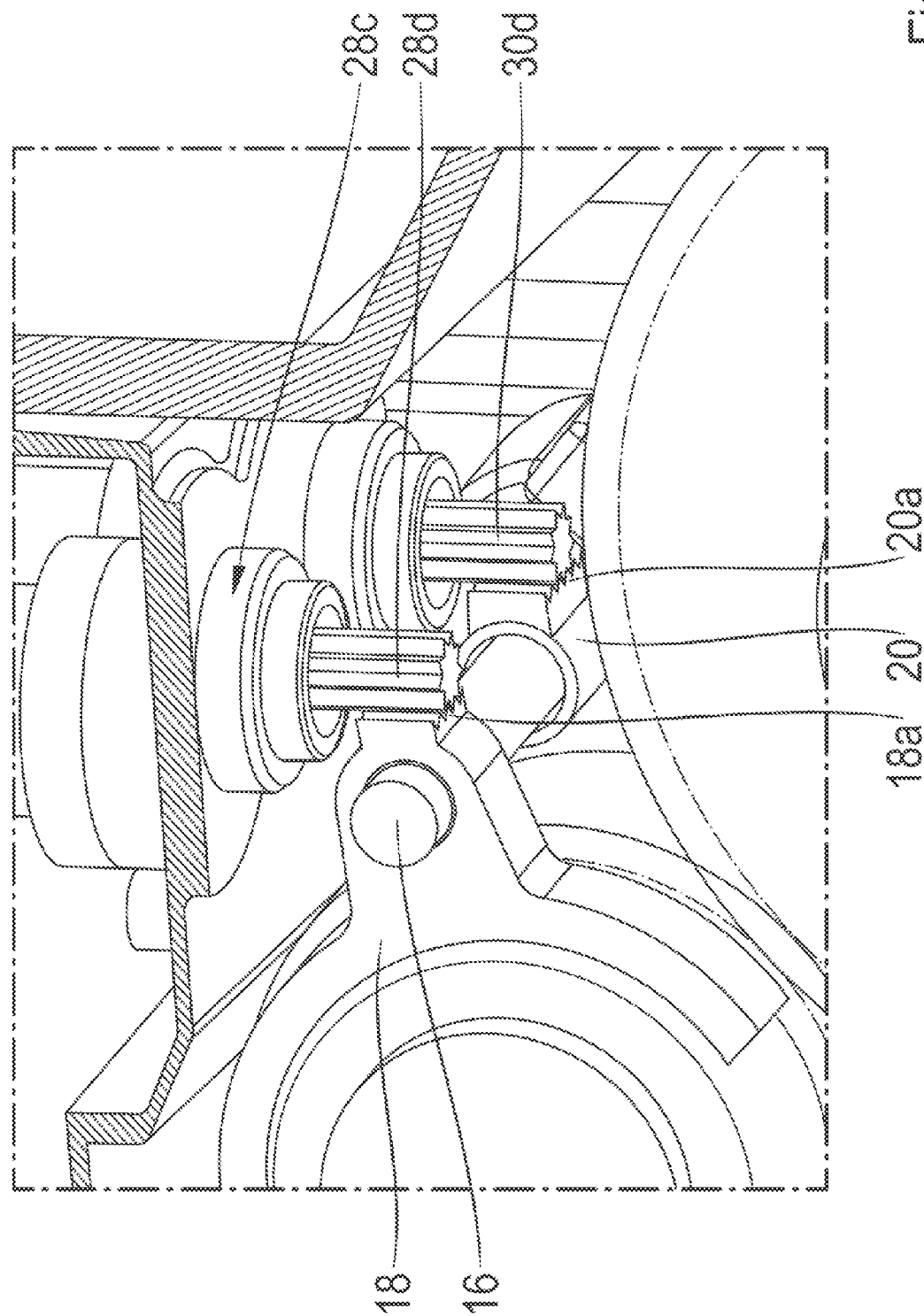
FIG. 2 shows a further view of the gearbox actuator unit and the gearbox.

FIGS. 1 to 4 show a gearbox 10. The gearbox is a manual gearbox provided for use in a commercial vehicle, for example a truck. The manual gearbox is automated and controlled via actuators.

The gearbox 10 includes a gearbox housing 12, a gearbox actuator unit 14, a guide rod 16, a first shift fork 18, and a second shift fork 20. The gearbox also comprises further components such as shafts, shift sleeves, gear wheels, etc., some of which are shown in the figures but are not described in detail. The construction and mode of operation of manual gearboxes are known from the prior art. The explanations below focus on the construction and mode of operation of the gearbox actuator unit 14.

The gearbox actuator unit 14 includes a housing 22, a control unit 24, a connection element 26, a first actuator 28, and a second actuator 30.

The housing 22 is formed in a plurality of portions, wherein a second housing portion 22b faces an interior of the gearbox and a first housing portion 22a is remote from the interior of the gearbox. The two housing portions 22a and 22b provide an interior space for receiving and arranging the components of the gearbox actuator unit 14. The two housing portions 22a and 22b are rigidly connected to each other. In particular, the interior of the housing 22 is sealed from the environment and also from the interior of the gearbox 10. In this exemplary embodiment, the two housing portions are screwed rigidly to each other.

The control device 24 is arranged on the first housing portion 22a, therefore in this case on the outer housing portion. The control device 24 in this case takes the form of a populated printed circuit board. In particular, the first housing portion 22a has cooling fins, which act to dissipate heat, on the side opposing the control device 24. The control device 24 is formed so as to be electronically connectable via a connection element 26 shown in FIG. 3. In particular, the connection element 26 provides a component of an electrical plug connection which acts to plug the control device 24 into the vehicle, for example into a wiring harness of the vehicle.

The control device 24 acts to activate the two actuators 28 and 30. The control device 24 is electrically connected to the actuators 28, 30, for example via plug connections or by establishing direct contact between the control device and the actuator. In the figures, connection elements 32, 34 for a plug connection of this type are shown by way of example on the actuators 28, 30.

The actuators 28, 30 are arranged, in particular attached, in this case screwed, on the second housing portion 22b. The second housing portion 22b takes the form of a pot, which provides sufficient space to receive the actuators 28, 30 within the housing. The pot shape is provided by a peripheral rim 36 on the outer periphery, a lateral wall 38, and a base 40. The rim 36 and the base 40 extend substantially in parallel planes, wherein the wall 38 extends substantially perpendicularly to the rim 36 and the base 40 and provides the axial offset between the rim 36 and the base 40. In particular, as shown in FIGS. 3 and 4, a further axial offset is provided in the base 40 itself. This ensures that the actuators 28, 30 are arranged within the housing 22, and furthermore that the installation space required for the gearbox actuator unit 14 within the gearbox 10 is particularly small.

The gearbox actuator unit 14 is arranged within an access opening 42 of the gearbox housing 12. The access opening enables the control device 24 and actuators 28, 30 to be arranged on the gearbox 10 and the actuators 28, 30 to pass through into the interior of the gearbox 10. This is particularly advantageous, since a portion of the gearbox housing 12 is dispensed with on account of the access opening 42 and this can simultaneously be used to arrange the control device 24 and actuators 28, 30 in a compact manner. This reduces the material required and, additionally, the installation space required.

The access opening and also the gearbox actuator unit 14 engaging therein are arranged at the top of the gearbox. In this case, "top" refers to a gearbox fitted in a vehicle. Due to the conventional arrangement of shift forks in manual gearboxes, it is possible to achieve a compact construction of the gearbox actuator unit 14; in particular, the construction of the actuators is very compact so that long transfer distances are avoided. Transferring forces over long transfer distances can lead to relatively high stresses, in particular distortions, within the actuators, which requires the actuators to have a reinforced configuration.

The access opening 42 forms a contact face 42a. This contact face 42a is arranged on an outer side of the gearbox housing 12. The contact face 42a provides a planar surface. The rim 36 of the second housing portion 22b of the gearbox actuator unit 14 has a contact face 36a. This contact face 36a faces the gearbox housing. The contact face 36a provides a planar surface. The contact faces 36a and 42a correspond to each other for sealing the gearbox 10. Sealing is achieved by direct contact between the contact faces 36a and 42a or with an intermediate sealing element. Direct contact is particularly advantageous if the second housing portion 22b is formed from a plastic material. A sealing element is formed for example from rubber or an elastomer. For example, a sealing element is formed by a gasket or a molded ring.

The actuator 28,30 has a stator 28a, 30a, a rotor 28b, 30b, a transmission 28c, 30c and a pinion 28d, 30d. A rotational movement of the rotor 28b, 30b is transferred to the pinion 28d, 30d via the transmission 28c, 30c, which is formed in this case by two gear wheels. The transmission ratio in this case has a value>1, so that a full rotation of the rotor 28b, 30b is translated into a partial rotation of the pinion 28d, 30d.

The second housing portion 22b has openings 44. The actuators 28, 30 pass through the openings 44 so that the pinions are arranged within the interior of the gearbox, wherein the remaining components of the actuators 28, 30 are arranged within the housing 22. Sealing is achieved by a radial shaft sealing ring so that lubricating oil, which acts to lubricate the mechanical components of the gearbox, does not reach the interior of the housing 22.

The gearbox is shifted via the shift forks 18, 20, which are arranged on a guide rod 16. The shift forks 18, 20 are formed so as to be axially movable relative to the guide rod 16. The shift forks 18, 20 are connected to a shift sleeve for joint movement. An axial movement of a shift fork 18, 20 is transferred to a shift sleeve which connects the corresponding gear wheel to the shaft in a rotationally engaged manner and thus engages a gear.

A rack 18a, 20a is formed on each of the shift forks 18, 20. The pinion 28d, 30d of the actuator 28, 30 is meshed with the rack 18a, 20a of the shift fork 18, 20. A rotational movement of an actuator is converted directly into a linear shifting movement of the shift fork, wherein the shift fork transfers the movement to the shift sleeve. Arranging the actuator close to the shift forks in this manner is particularly advantageous, since high mechanical stresses, in particular deflections in the interior of the actuator as well as on the shift fork, are avoided due to the short distance. The connection distances between the actuators and the control device are also particularly short. By arranging the actuators and the control device within the housing, these components are particularly effectively protected from contaminants and environmental influences. This also ensures that the gearbox actuator unit can be pre-assembled in a simple manner, which also allows the gearbox actuator unit to be installed on the gearbox in a rapid, simple manner.

FIGS. 5-8 show a further configuration variant of a gearbox actuator unit 14, wherein the installation process in particular is set out below. This gearbox actuator unit corresponds substantially to the gearbox actuator unit 14 as shown in FIGS. 1-4, and therefore the above explanations also apply to the gearbox actuator unit described below. The reference signs are therefore adopted identically for FIGS. 5-8. The differences between the gearbox actuator units are described in detail below.

In this case, the gearbox actuator unit 14 has three actuators which are provided for actuating three shift forks. Each actuator is arranged on a separate plane of the base 40, wherein these planes are offset in height from one another. The actuators 28, 30, and 46 may be identical to one another. In another aspect, the actuators 28, 30, and 46 may be arranged at the same height and have pinions with different lengths.

Figure 5:
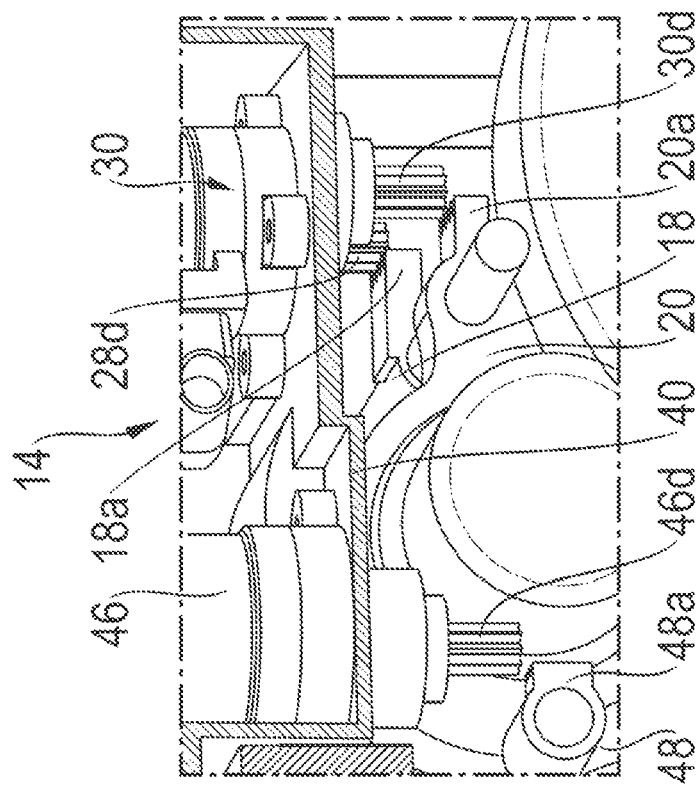
FIGS. 5-8 show a further configuration variant of a gearbox actuator unit during the installation process.

FIG. 5 shows that, in a first step of inserting the gearbox actuator unit 14, the pinion 28d comes into contact with the rack 18a of the shift fork 18. The point at which the pinion 28d contacts the rack 18a defines a point of engagement, which is invariable, and also defines the point of contact on the pinion 28d, which corresponds substantially to the end face of the pinion 28d. The actuators 30 and 46 are at a distance from the shift forks 20 and 48 at this position.

Figure 6:
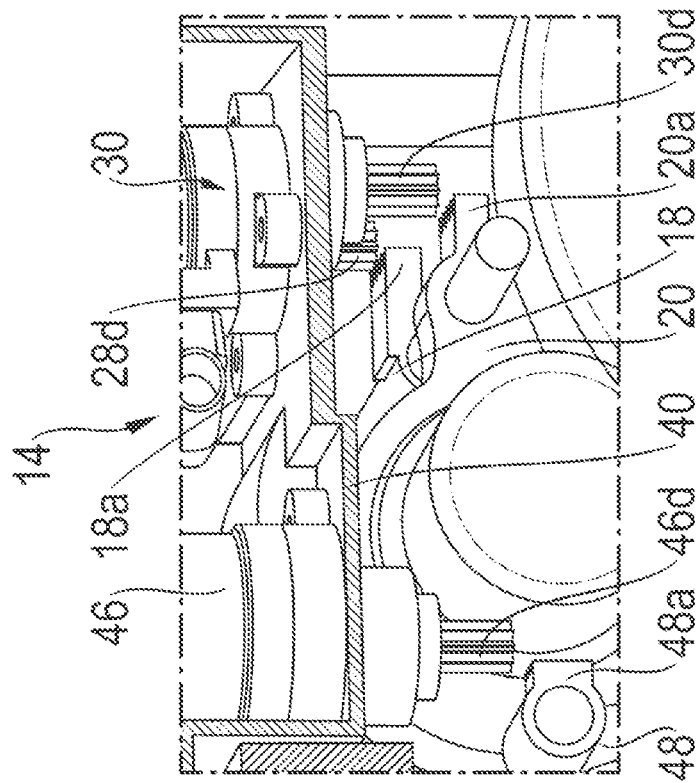

A further step in the installation process is shown in FIG. 6. The first actuator 28 is intermeshed with the associated shift fork 18 and is already inserted in part into the rack 18a of the shift fork 18. The second actuator 30 then comes into contact with the second shift fork 20 so that the pinion 30d and rack 20a are intermeshed. The third actuator 46 is still at a distance from the third shift fork 48 in this position.

Figure 7:
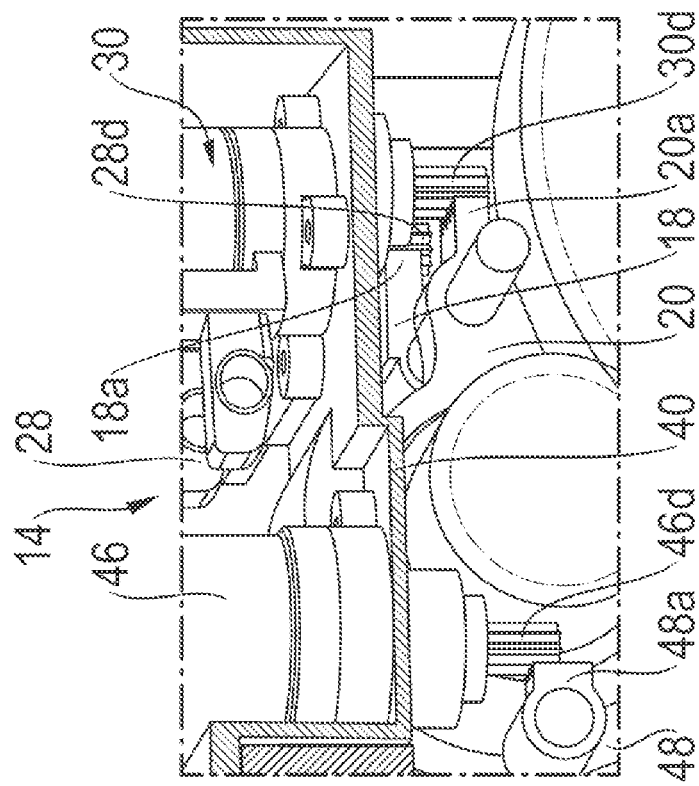

As shown in FIG. 7, the third actuator 46 becomes intermeshed, via the pinion 46d thereof, with the rack 48a of the third shift fork 48. The first actuator 28 and the second actuator 30 are already meshed in part.

Figure 8:
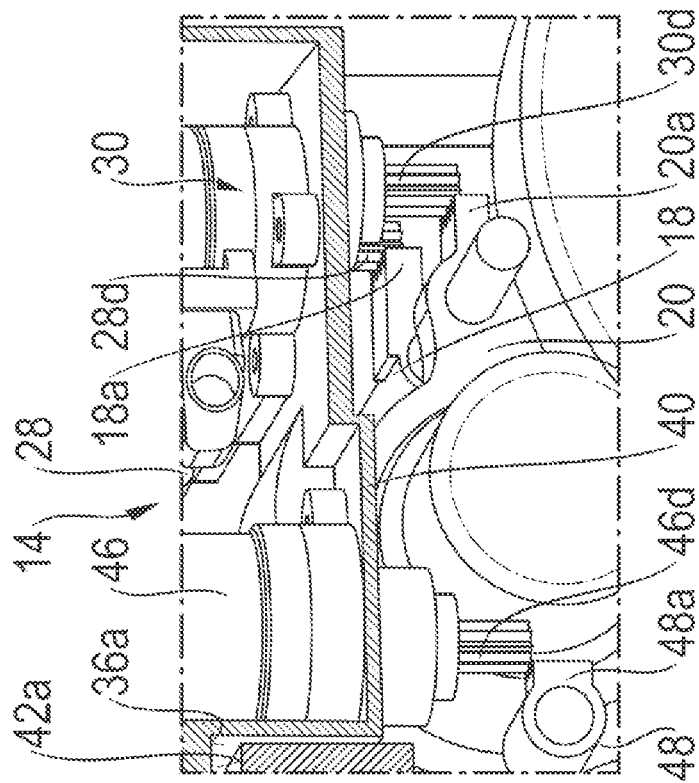

In FIG. 8, the gearbox actuator unit 14 is shown in a final position relative to the gearbox housing 12. The contact faces 36a and 42a are in contact with each other. The actuators 28, 30, and 46 are meshed with the shift forks 18, 20, and 48. Each actuator 28, 30 and 46 has an engagement length determined by the distance between the point of engagement (at the top of the rack) and the point of contact on the pinion (at the bottom of the pinion) in the final position thereof. The first actuator 28 has a greater engagement length than the second actuator 30, and the second actuator 30 has a greater engagement length than the third actuator 46. This ensures simple installation, which allows the actuators to be intermeshed in succession with the shift forks.

REFERENCE SIGNS 10 gearbox
12 gearbox housing
14 gearbox actuator unit
16 guide rod
18 first shift fork
18a rack
20 second shift fork
20a rack
22 housing
22a first housing portion
22b second housing portion
24 control unit
26 connection element
28 first actuator
28a stator
28b rotor
28c transmission
28d pinion 30 second actuator
30a stator
30b rotor
30c transmission
30d pinion
32 connection element
34 connection element
36 rim
36a contact face
38 wall
40 base
42 access opening
42a contact face
44 opening
46 third actuator
46d pinion
48 shift fork
48a rack

The invention claimed is:

1. A gearbox actuator unit (14), configured for installation on a gearbox (10), comprising:
 a housing (22),
 a control device (24), and
 at least one actuator (28, 30),
 wherein the housing (22) is sized and shaped for attachment on a gearbox housing (12) and for sealing with the gearbox housing (12),
 wherein the control device (24) is electrically connected to the at least one actuator (28, 30) and configured to activate the actuator (28, 30),
 wherein the at least one actuator (28, 30) is configured to actuate at least one shift fork (18, 20) of the gearbox (10) and configured for connection to the at least one shift fork (18, 20) of the gearbox (10),
 wherein the control device (24) and the at least one actuator (28, 30) are arranged within the housing (22);
 wherein the at least one actuator (28,30) includes a pinion (28d, 30d) that passes through at least one opening (44) in the housing (22) and extends beyond the housing (22);
 wherein the at least one actuator (28, 30) comprises at least two actuators (28, 30), wherein an engagement length of the pinion of one of the actuators (28, 30) is greater than an engagement length of the pinion of another of the actuators (28, 30).

2. The gearbox actuator unit (14) of claim 1, wherein the housing (22) comprises a plurality of portions including at least a first housing portion (22a) and a second housing portion (22b).

3. The gearbox actuator unit (14) of claim 2, wherein the second housing portion (22b) has a rim, a wall, and a base.

4. The gearbox actuator unit (14) of claim 1, wherein the at least one actuator (28, 30) includes a transmission (28c, 30c).

5. The gearbox actuator unit (14) of claim 1, wherein the opening (44) in the housing (22) is sealed with the pinion (28d, 30d) in a fluid-tight manner.

6. The gearbox actuator unit (14) of claim 1, wherein the housing (22) has a planar and peripherally closed contact face (36a) configured for making contact with and sealing with the gearbox housing (12).

7. The gearbox actuator unit (14) of claim 1, wherein the control device (24) has a connection element (26) for establishing an electrical connection with the vehicle.

8. The gearbox actuator unit (14) of claim 1, wherein the lower ends of the pinions of each of the actuators are disposed at different heights.

9. The gearbox actuator unit (14) of claim 3, wherein the at least one actuator (28, 30) is mounted to the second housing portion (22b), and the control unit (24) is mounted to the first housing portion (22a).

10. The gearbox actuator unit (14) of claim 9, wherein the first housing portion (22a) includes cooling fins.

11. The gearbox actuator unit (14) of claim 9, wherein the first and second housing portions (22a, 22b) are sealingly connected, wherein the control unit (24) and the at least one actuator (28, 30) are disposed therein, wherein at least one pinion of the at least one actuator sealingly extends through at least one opening of the second housing portion (22b) and is arranged for engagement with at least one shift fork.

12. The gearbox actuator unit (14) of claim 9, wherein the base of the second housing portion is axially offset from the rim and the wall extends axially from the base to the rim, wherein the rim is peripherally closed and includes a contact surface configured for sealing attachment with a contact face surrounding an opening of the gearbox housing.

13. The gearbox actuator unit (14) of claim 12, wherein the base includes an axial offset defining a plurality of planes including at least a lower plane and an upper plane.

14. The gearbox actuator unit (14) of claim 13, wherein the at least one actuator includes at least two actuators, and one of the actuators is disposed on the lower plane and another of the actuators is disposed on the upper plane.

15. A gearbox (10) comprising:
 a gearbox housing (12),
 at least one shift fork (18, 20) disposed within the gearbox housing (12),
 a gearbox actuator unit (14) installed on the gearbox housing (12), wherein the gearbox actuator unit (14) comprises:
 a housing (22),
 a control device (24), and
 at least one actuator (28, 30),
 wherein the housing (22) is attached on the gearbox housing (12) and sealed with the gearbox housing (12),
 wherein the control device (24) is electrically connected to the at least one actuator (28, 30) and activates the at least one actuator (28, 30),
 wherein the at least one actuator (28, 30) is connected to the at least one shift fork (18, 20) of the gearbox (10) and actuates the at least one shift fork (18, 20) of the gearbox (10),
 wherein the control device (24) and the at least one actuator (28, 30) are arranged within the housing (22);
 wherein the at least one actuator (28, 30) includes at least one pinion, wherein the at least one pinion is intermeshed with at least one rack of the at least one shift fork, wherein the at least one shift fork is slidingly attached on a guide rod within the gearbox.

16. The gearbox (10) of claim 15, wherein the gearbox (10) includes an access opening (42) formed in the gearbox housing (12), wherein the gearbox actuator unit (14) is arranged in the access opening (42), and wherein the gearbox actuator unit (14) closes and seals the access opening (42).

17. The gearbox (10) of claim 15, wherein the at least one actuator (28, 30) includes at least two actuators and the at least one shift fork includes at least two shift forks, wherein an engagement length of the pinion of one of the actuators with the rack of one of the shift forks is greater than an engagement length of the pinion of another of the actuators with the rack of another of the shift forks.

18. A gearbox actuator unit (14), configured for installation on a gearbox (10), comprising:

a housing (22), a control device (24), and at least one actuator (28, 30), wherein the housing (22) is sized and shaped for attachment on a gearbox housing (12) and for sealing with the gearbox housing (12), wherein the control device (24) is electrically connected to the at least one actuator (28, 30) and configured to activate the actuator (28, 30), wherein the at least one actuator (28, 30) is configured to actuate at least one shift fork (18, 20) of the gearbox (10) and configured for connection to the at least one shift fork (18, 20) of the gearbox (10), wherein the control device (24) and the at least one actuator (28, 30) are arranged within the housing (22);

wherein the housing (22) comprises a plurality of portions including at least a first housing portion (22*a*) and a second housing portion (22*b*);

wherein the second housing portion (22*b*) has a rim, a wall, and a base;

wherein the at least one actuator (28, 30) is mounted to the second housing portion (22*b*), and the control unit (24) is mounted to the first housing portion (22*a*);

wherein the base of the second housing portion is axially offset from the rim and the wall extends axially from the base to the rim, wherein the rim is peripherally closed and includes a contact surface configured for sealing attachment with a contact face surrounding an opening of the gearbox housing, wherein the base includes an axial offset defining a plurality of planes including at least a lower plane and an upper plane.

* * * * *